United States Patent
Albeez

(10) Patent No.: US 8,844,988 B1
(45) Date of Patent: Sep. 30, 2014

(54) ENERGY ABSORBER SYSTEM AND ENERGY ABSORBER THEREOF

(71) Applicant: GM Global Technology Operations LLC, Detroit, MI (US)

(72) Inventor: Syed R. Albeez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/861,753

(22) Filed: Apr. 12, 2013

(51) Int. Cl.
  *B60R 19/34* (2006.01)
  *B60R 19/18* (2006.01)

(52) U.S. Cl.
  CPC ........................................ *B60R 19/18* (2013.01)
  USPC .......................................... 293/133; 296/187.1

(58) Field of Classification Search
  CPC   B60R 19/02; B60R 19/023; B60R 2019/002; B60R 2019/026; B62D 25/16
  USPC ................... 293/133; 296/187.09, 187.1, 198
  See application file for complete search history.

(56) References Cited

U.S. PATENT DOCUMENTS

| | | | |
|---|---|---|---|
| 6,270,131 B1 * | 8/2001 | Martinez et al. | 293/132 |
| 7,357,445 B2 * | 4/2008 | Gross et al. | 296/187.09 |
| 2013/0154286 A1 * | 6/2013 | Tamada et al. | 293/133 |

\* cited by examiner

*Primary Examiner* — Dennis H Pedder
*Assistant Examiner* — Beverly Becker
(74) *Attorney, Agent, or Firm* — Quinn Law Group, PLLC

(57) ABSTRACT

An energy absorber system for a vehicle includes a brace assembly having a front end. The system includes an energy absorber attachable to the assembly and having an inner wedge and an outer wedge. The inner wedge is attachable to the front end, defines a cavity, and has a primary side, a secondary side, a proximal side, and a distal side. The outer wedge is attachable to the inner wedge to cover the cavity, and has a first side configured for contacting and covering the primary side, a second side configured for contacting and covering the secondary side, a third side configured for contacting and covering the proximal side, a fourth side extending from the third side at an angle of less than or equal to 90 degrees and having a deflection surface and an interior surface, and a plurality of bulkheads projecting from the inner surface.

20 Claims, 2 Drawing Sheets

ENERGY ABSORBER SYSTEM AND ENERGY ABSORBER THEREOF

TECHNICAL FIELD

The present disclosure relates to an energy absorber system and an energy absorber for a vehicle.

BACKGROUND

Vehicles, such as automotive vehicles, are often equipped with one or more energy absorbers, such as a front and/or rear bumper. Such energy absorbers are configured to absorb and/or dissipate energy during contact between the vehicle and an object external to the vehicle.

SUMMARY

An energy absorber system for a vehicle includes a brace assembly and an energy absorber attachable to the brace assembly. The brace assembly defines a front wheelhouse and has a front end spaced apart from the front wheelhouse. The energy absorber includes an inner wedge attachable to the front end and defining a cavity therein, and an outer wedge attachable to the inner wedge to thereby cover the cavity. The inner wedge has a primary side, a secondary side spaced apart from the primary side, a proximal side interconnecting the primary side and the secondary side, and a distal side interconnecting the primary side and the secondary side and spaced apart from the proximal side. The outer wedge has a first side configured for contacting and covering the primary side, and a second side spaced apart from the first side and configured for contacting and covering the secondary side. The outer wedge also has a third side interconnecting the first side and the second side and configured for contacting and covering the proximal side, and a fourth side extending from the third side at an angle of less than or equal to 90 degrees, and having a deflection surface and an interior surface spaced opposite the deflection surface. The outer wedge also includes a plurality of bulkheads projecting from the interior surface.

In one embodiment, the fourth side has a distal edge extending along the deflection surface and the interior surface, a primary flap configured for covering and abutting the first side, and a secondary flap configured for covering and abutting the second side. Further, the outer wedge includes a first bulkhead projecting from and extending along the interior surface from the third side to the distal edge, and a second bulkhead spaced apart from and substantially parallel to the first bulkhead. The second bulkhead projects from and extends along the interior surface from the third side to the distal edge. The outer wedge also includes a third bulkhead disposed between and substantially parallel to the first bulkhead and the second bulkhead. The third bulkhead projects from and extends along the interior surface from the third side to the distal edge. In addition, the outer wedge includes a fourth bulkhead projecting from the interior surface, and interconnecting and substantially perpendicular to the first bulkhead and the third bulkhead.

An energy absorber for a vehicle includes an inner wedge attachable to the vehicle and defining a cavity therein, and an outer wedge attachable to the inner wedge to thereby cover the cavity. The inner wedge has a primary side, a secondary side spaced apart from the primary side, a proximal side interconnecting the primary side and the secondary side, and a distal side interconnecting the primary side and the secondary side and spaced apart from the proximal side. The outer wedge has a first side configured for contacting and covering the primary side, and a second side spaced apart from the first side and configured for contacting and covering the secondary side. The outer wedge also has a third side and a fourth side. The third side interconnects the first side and the second side and is configured for contacting and covering the proximal side. The fourth side extends from the third side at an angle of less than or equal to 90 degrees, and has a deflection surface and an interior surface spaced opposite the deflection surface. The outer wedge also includes a plurality of bulkheads projecting from the interior surface.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
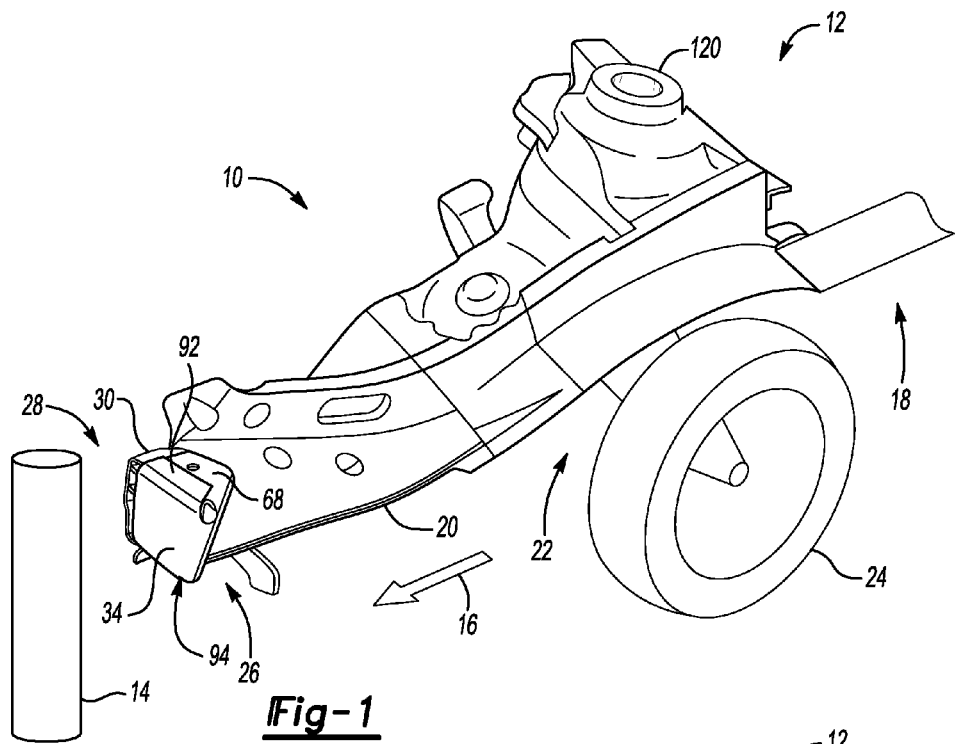
FIG. 1 is a schematic perspective fragmentary illustration of an energy absorber system for a vehicle, and includes an energy absorber attached to a brace assembly, wherein the energy absorber has an outer wedge attached to an inner wedge.

Referring to the Figures, wherein like reference numerals refer to like elements, an energy absorber system 10 for a vehicle 12 is shown generally in FIG. 1. The energy absorber system 10 may be useful for absorbing and/or dissipating energy during contact between the vehicle 12 and an object 14 or barrier external to and in front of the vehicle 12 as the vehicle 12 travels in a forward direction (indicated generally by arrow 16). As shown in FIG. 1, the vehicle 12 may have a driver side 18, and the energy absorber system 10 may be useful for deflecting the driver side 18 away from the object 14 during contact between the vehicle 12 and the object 14. As such, the energy absorber system 10 may be useful for automotive applications. However, the energy absorber system 10 may also be useful for non-automotive applications, including, for example, industrial vehicle and recreational vehicle applications.

Referring again to FIG. 1, the energy absorber system 10 includes a brace assembly 20 defining a front wheelhouse 22. The front wheelhouse 22 may be a component or assembly of the vehicle 12 and may provide structural support for other vehicle components, such as an upper rail assembly (not shown). The front wheelhouse 22 may receive a wheel 24 of the vehicle 12, and may be characterized as the front, driver-side wheelhouse. Further, the brace assembly 20 may extend longitudinally along the vehicle 12, form a portion of the body of the vehicle 12 along the driver side 18, and may also provide support and/or attachment points for other vehicle components. Although only a portion of the front wheelhouse 22 is illustrated in FIG. 1, the brace assembly 20 may extend lengthwise along an entirety of the driver side 18 to define both the front wheelhouse 22, a shock tower housing 120, and a rear wheelhouse (not shown) of the vehicle 12. In addition, the brace assembly 20 has a front end 26 spaced apart from the front wheelhouse 22, i.e., along the forward direction 16 of vehicle travel.

Figure 4:
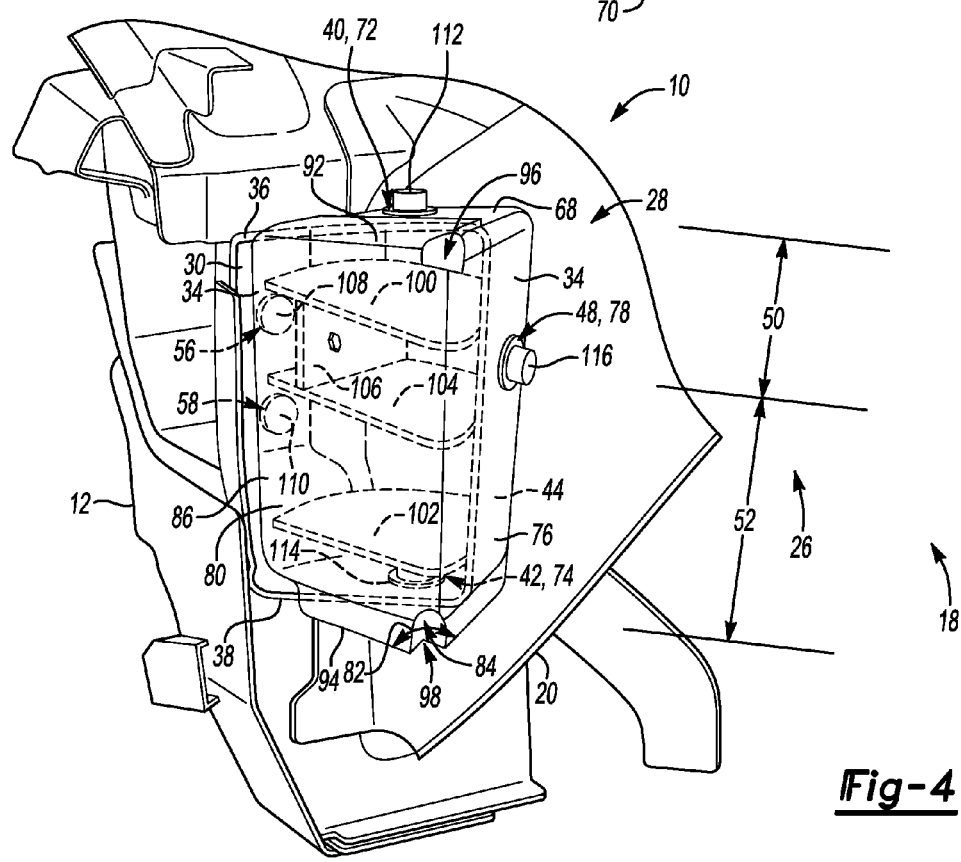
FIG. 4 is a schematic perspective fragmentary illustration of the energy absorber of FIG. 1, wherein the outer wedge is attached to the inner wedge.

With continued reference to FIG. 1 and shown in greater detail in FIG. 4, the energy absorber system 10 also includes an energy absorber 28 attachable to the brace assembly 20. The energy absorber 28 includes an inner wedge 30 attachable to the front end 26 and defining a cavity 32 (FIG. 2) therein, and an outer wedge 34 attachable to the inner wedge 30 to thereby cover the cavity 32. That is, the inner wedge 30 is attachable to the vehicle 12, and the outer wedge 34 is attachable to the inner wedge 30 to thereby cover the cavity 32.

Figure 2:
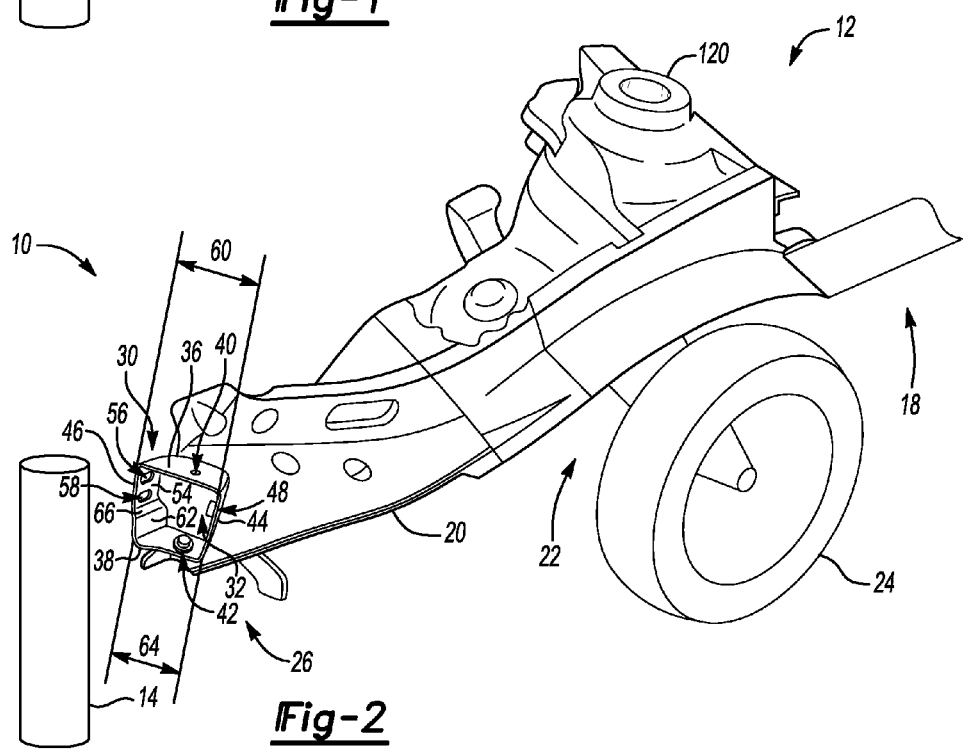
FIG. 2 is a schematic perspective fragmentary illustration of the inner wedge of FIG. 1.

Referring now to FIG. 2, the inner wedge 30 has a primary side 36 and a secondary side 38 spaced apart from the primary side 36. The primary side 36 may define a first bore 40 therethrough, and the secondary side 38 may define a second bore 42 therethrough. Further, the inner wedge 30 has a proximal side 44 interconnecting the primary side 36 and the secondary side 38, and a distal side 46 interconnecting the primary side 36 and the secondary side 38 and spaced apart from the proximal side 44. The proximal side 44 may define a third bore 48 spaced apart from the primary side 36 by a first distance 50 (FIG. 4), and spaced apart from the secondary side 38 by a second distance 52 (FIG. 4) that is greater than the first distance 50.

With continued reference to FIG. 2, the distal side 46 may have a first portion 54 defining a fourth bore 56 therethrough and a fifth bore 58 therethrough spaced apart from the fourth bore 56. The first portion 54 may be spaced apart from the proximal side 44 by a first length 60. Further, the distal side 46 may have a second portion 62 spaced apart from the proximal side 44 by a second length 64 that is less than the first length 60. That is, the second portion 62 may be disposed closer to the proximal side 44 than the first portion 54 is spaced apart from the proximal side 44. In addition, the distal side 46 may have a shelf portion 66 interconnecting the first portion 54 and the second portion 62, wherein the shelf portion 66 is substantially parallel to the primary side 36 and the secondary side 38. Stated differently, the distal side 46 may have a stepped configuration.

Therefore, as best shown in FIG. 2, the inner wedge 30 may have a wedged box-like shape, and may be formed from any suitable material. In one non-limiting example, the inner wedge 30 may be formed from DP1000, hot-dip galvanized high strength steel.

Figure 3:
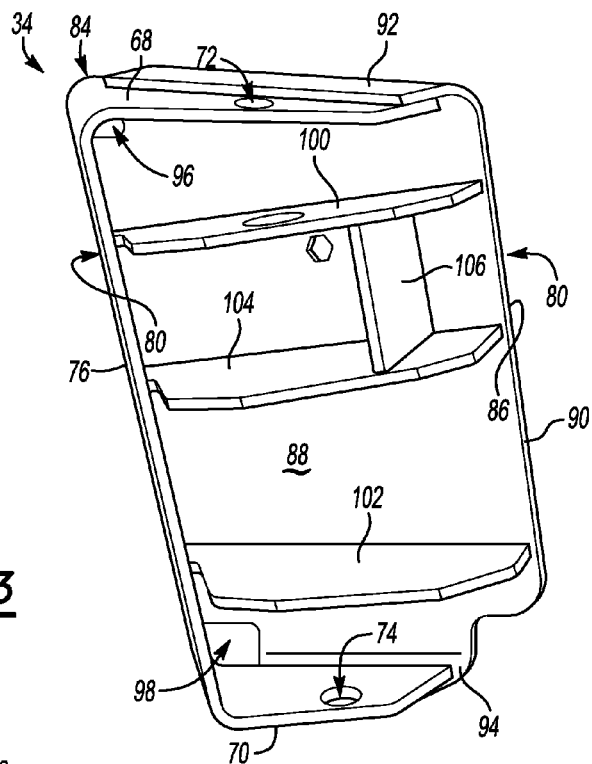
FIG. 3 is a schematic perspective illustration of an interior surface of the outer wedge of FIG. 1.

Referring now to FIG. 3, the outer wedge 34 has a first side 68 configured for contacting and covering the primary side 36 (FIG. 2) when the outer wedge 34 is attached to the inner wedge 30 (FIG. 2), and a second side 70 spaced apart from the first side 68 and configured for contacting and covering the secondary side 38 (FIG. 2) when the outer wedge 34 is attached to the inner wedge 30. The first side 68 may define a sixth bore 72 therethrough, and the second side 70 may define a seventh bore 74 therethrough.

In addition, with continued reference to FIG. 3, the outer wedge 34 includes a third side 76 interconnecting the first side 68 and the second side 70 and configured for contacting and covering the proximal side 44 (FIG. 2) when the outer wedge 34 is attached to the inner wedge 30 (FIG. 2). The third side 76 may define an eighth bore 78 (FIG. 4) therethrough.

Further, as shown in FIG. 4, the outer wedge 34 includes a fourth side 80 extending from the third side 76 at an angle 82 of less than or equal to 90 degrees. For example, the third side 76 and the fourth side 80 may define a vertex 84 having the angle 82 of less than or equal to 90 degrees. Without intending to be limited by theory, the angle 82 may contribute to the strength and robustness of the energy absorber 28, since the angle 82 provides the energy absorber 28 with a wedge shape.

Referring again to FIG. 3, the fourth side 80 also has a deflection surface 86 and an interior surface 88 spaced opposite the deflection surface 86. As set forth in more detail below, the interior surface 88 may face the cavity 32 (FIG. 2) when the outer wedge 34 is attached to the inner wedge 30 (FIG. 2), and the deflection surface 86 may face the object 14 (FIG. 1) or the front of the vehicle 12 (FIG. 1). The fourth side 80 may further include a distal edge 90 extending along the deflection surface 86 and the interior surface 88, a primary flap 92 configured for overlapping and abutting the first side 68 when the outer wedge 34 is attached to the inner wedge 30, and a secondary flap 94 configured for overlapping and abutting the second side 70 when the outer wedge 34 is attached to the inner wedge 30. Therefore, as best shown in FIG. 3, the outer wedge 34 may have a wedged box-like shape and may be configured to glove-over the inner wedge 30. More specifically, referring to FIG. 4, the outer wedge 34 may overlap and contact the primary side 36, the secondary side 38, and the proximal side 44, as set forth in more detail below.

Further, referring again to FIG. 3, the primary flap 92 may fold over the first side 68, and the secondary flap 94 may fold over the second side 70. As such, the first side 68, the third side 76, the fourth side 80, and the primary flap 92 may together define a first void 96 spaced apart from the distal edge 90. Similarly, the second side 70, the third side 76, and the secondary flap 94 may together define a second void 98 spaced apart from the first void 96 and the distal edge 90. The first void 96 and the second void 98 may provide the energy absorber 28 with strength and rigidity, and may reduce a mass of the energy absorber 28 (FIG. 1).

Referring again to FIG. 3, the outer wedge 34 also includes a plurality of bulkheads 100, 102, 104, 106 projecting from the interior surface 88. In particular, the outer wedge 34 may have a first bulkhead 100 extending along the interior surface 88 from the third side 76 to the distal edge 90, and a second bulkhead 102 spaced apart from and substantially parallel to the first bulkhead 100. Likewise, the second bulkhead 102 may extend along the interior surface 88 from the third side 76 to the distal edge 90. That is, the second bulkhead 102 may project from and extend along the interior surface 88 from the third side 76 to the distal edge 90.

With continued reference to FIG. 3, the outer wedge 34 may also have a third bulkhead 104 disposed between and substantially parallel to the first bulkhead 100 and the second bulkhead 102, and extending along the interior surface 88 from the third side 76 to the distal edge 90. That is, the third bulkhead 104 may project from and extend along the interior surface 88 from the third side 76 to the distal edge 90. As such, the first bulkhead 100, the second bulkhead 102, and the third bulkhead 104 may be parallel to and spaced apart from one another. Further, the outer wedge 34 may have a fourth bulkhead 106 interconnecting and substantially perpendicular to the first bulkhead 100 and the third bulkhead 104. That is, the fourth bulkhead 106 may also project from the interior surface 88, but may be disposed substantially perpendicular to the first bulkhead 100 and the third bulkhead 104. Therefore, the fourth bulkhead 106 may cross-brace and span the first bulkhead 100 and the third bulkhead 104 to provide the outer wedge 34 with strength and rigidity.

Each of the plurality of bulkheads 100, 102, 104, 106 may be metal inert gas (MIG)-welded to the interior surface 88. Further, the fourth bulkhead 106 may be metal inert gas (MIG)-welded to each of the first bulkhead 100 and the third bulkhead 104. As such, without intending to be limited by theory, the plurality of bulkheads 100, 102, 104, 106 may contribute to the strength, rigidity, and impact-resistance of the energy absorber 28.

Referring again to FIG. 4, the energy absorber system 10 may further include a plurality of fasteners 108, 110 each configured for attaching the inner wedge 30 to the brace assembly 20. That is, a respective one of the plurality of fasteners 108, 110 may extend through each of the fourth bore 56 and the fifth bore 58 to thereby attach the inner wedge 30 to the brace assembly 20.

As further described with reference to FIG. 4, the energy absorber system 10 may also include a plurality of bolts 112, 114, 116 each configured for attaching the outer wedge 34 to the inner wedge 30. As a non-limiting example, each of the plurality of bolts 112 may be an M-8 bolt. In particular, as arranged for assembly, the first bore 40 may be coaxial with the sixth bore 72 and may receive one of the plurality of bolts 112 so that the primary flap 92 overlaps and abuts the first side 68. Similarly, the second bore 42 may be coaxial with the seventh bore 74 and may receive one of the plurality of bolts 114 so that the secondary flap 94 overlaps and abuts the second side 70 (FIG. 3). Likewise, the third bore 48 may be coaxial with the eighth bore 78 and may receive one of the plurality of bolts 116 so that the third side 76 overlaps and abuts the proximal side 44. As such, the outer wedge 34 may cover and attach to the inner wedge 30 to form the energy absorber 28.

The energy absorber system 10 provides the vehicle 12 (FIG. 1) with energy dissipation capability during contact between the vehicle 12 and the object 14 (FIG. 1). For example, the energy absorber 28 may absorb energy transferred to the vehicle 12 during contact between the vehicle 12 and the object 14, and/or may deflect the vehicle 12, e.g., the driver side 18 (FIG. 1), away from the object 14.

While the best modes for carrying out the present invention have been described in detail, those familiar with the art to which this invention relates will recognize various alternative designs and embodiments for practicing the invention within the scope of the appended claims.

The invention claimed is:

1. An energy absorber system for a vehicle, the energy absorber system comprising:
    a brace assembly defining a front wheelhouse and having a front end spaced apart from the front wheelhouse; and
    an energy absorber attachable to the brace assembly and including:
        an inner wedge attachable to the front end and defining a cavity therein, wherein the inner wedge has:
            a primary side;
            a secondary side spaced apart from the primary side;
            a proximal side interconnecting the primary side and the secondary side; and
            a distal side interconnecting the primary side and the secondary side and spaced apart from the proximal side; and
        an outer wedge attachable to the inner wedge to thereby cover the cavity, wherein the outer wedge has:
            a first side configured for contacting and covering the primary side;
            a second side spaced apart from the first side and configured for contacting and covering the secondary side;
            a third side interconnecting the first side and the second side and configured for contacting and covering the proximal side;
            a fourth side extending from the third side at an angle of less than or equal to 90 degrees, and having a deflection surface and an interior surface spaced opposite the deflection surface; and
            a plurality of bulkheads projecting from the interior surface.

2. The energy absorber system of claim 1, wherein the fourth side further includes a distal edge extending along the deflection surface and the interior surface, and further wherein the outer wedge has:
    a first bulkhead extending along the interior surface from the third side to the distal edge;
    a second bulkhead spaced apart from and substantially parallel to the first bulkhead, and extending along the interior surface from the third side to the distal edge;
    a third bulkhead disposed between and substantially parallel to the first bulkhead and the second bulkhead, and extending along the interior surface from the third side to the distal edge; and
    a fourth bulkhead interconnecting and substantially perpendicular to the first bulkhead and the third bulkhead.

3. The energy absorber system of claim 1, wherein the outer wedge overlaps and contacts the primary side, the secondary side, and the proximal side.

4. The energy absorber system of claim 1, wherein the primary side defines a first bore therethrough, the secondary side defines a second bore therethrough, and the proximal side defines a third bore therethrough spaced apart from the primary side by a first distance, and spaced apart from the secondary side by a second distance that is greater than the first distance.

5. The energy absorber system of claim 4, wherein the distal side has:
    a first portion defining a fourth bore therethrough and a fifth bore therethrough spaced apart from the fourth bore, wherein the first portion is spaced apart from the proximal side by a first length;
    a second portion spaced apart from the proximal side by a second length that is less than the first length; and
    a shelf portion interconnecting the first portion and the second portion, wherein the shelf portion is substantially parallel to the primary side and the secondary side.

6. The energy absorber system of claim 5, further including a plurality of fasteners, wherein a respective one of the plurality of fasteners extends through each of the fourth bore and the fifth bore to thereby attach the inner wedge to the brace assembly.

7. The energy absorber system of claim 5, wherein the first side defines a sixth bore therethrough, the second side defines a seventh bore therethrough, and the third side defines an eighth bore therethrough.

8. The energy absorber system of claim 7, wherein the fourth side has:
    a primary flap configured for overlapping and abutting the first side; and
    a secondary flap configured for overlapping and abutting the second side.

9. The energy absorber system of claim 8, further including a plurality of bolts each configured for attaching the outer wedge to the inner wedge.

10. The energy absorber system of claim 9, wherein the first bore is coaxial with the sixth bore and receives one of the plurality of bolts so that the primary flap overlaps and abuts the first side.

11. The energy absorber system of claim 9, wherein the second bore is coaxial with the seventh bore and receives one of the plurality of bolts so that the secondary flap overlaps and abuts the second side.

12. The energy absorber system of claim 9, wherein the third bore is coaxial with the eighth bore and receives one of the plurality of bolts so that the third side overlaps and abuts the proximal side.

13. The energy absorber system of claim 8, wherein the fourth side further includes a distal edge extending along the deflection surface and the interior surface, and further wherein the first side, the third side, the fourth side, and the primary flap together define a first void spaced apart from the distal edge.

14. The energy absorber system of claim 13, wherein the second side, the third side, and the secondary flap together define a second void spaced apart from the first void and the distal edge.

15. An energy absorber system for a vehicle, the energy absorber system comprising:
a brace assembly defining a front wheelhouse and having a front end spaced apart from the front wheelhouse; and
an energy absorber attachable to the brace assembly and including:
an inner wedge attachable to the front end and defining a cavity therein, wherein the inner wedge has:
a primary side;
a secondary side spaced apart from the primary side;
a proximal side interconnecting the primary side and the secondary side; and
a distal side interconnecting the primary side and the secondary side and spaced apart from the proximal side; and
an outer wedge attachable to the inner wedge to thereby cover the cavity, wherein the outer wedge has:
a first side configured for contacting and covering the primary side;
a second side spaced apart from the first side and configured for contacting and covering the secondary side;
a third side interconnecting the first side and the second side and configured for contacting and covering the proximal side;
a fourth side extending from the third side at an angle of less than or equal to 90 degrees and having:
a deflection surface;
an interior surface spaced opposite the deflection surface;
a distal edge extending along the deflection surface and the interior surface;
a primary flap configured for covering and abutting the first side; and
a secondary flap configured for covering and abutting the second side;
a first bulkhead projecting from and extending along the interior surface from the third side to the distal edge;
a second bulkhead spaced apart from and substantially parallel to the first bulkhead, wherein the second bulkhead projects from and extends along the interior surface from the third side to the distal edge;
a third bulkhead disposed between and substantially parallel to the first bulkhead and the second bulkhead, wherein the third bulkhead projects from and extends along the interior surface from the third side to the distal edge; and
a fourth bulkhead projecting from the interior surface, and interconnecting and substantially perpendicular to the first bulkhead and the third bulkhead.

16. The energy absorber system of claim 15, wherein:
the distal side has a first portion spaced apart from the proximal side by a first length, a second portion spaced apart from the proximal side by a second length that is less than the first length, and a shelf portion interconnecting the first portion and the second portion; and further wherein:
the primary side defines a first bore therethrough;
the secondary side defines a second bore therethrough;
the proximal side defines a third bore therethrough spaced apart from the primary side by a first distance, and spaced apart from the secondary side by a second distance that is greater than the first distance; and
the first portion defines a fourth bore therethrough and a fifth bore therethrough spaced apart from the fourth bore.

17. The energy absorber system of claim 16, further including a plurality of bolts each configured for attaching the outer wedge to the inner wedge;
wherein the first bore is coaxial with the sixth bore and receives one of the plurality of bolts so that the primary flap overlaps and abuts the first side;
wherein the second bore is coaxial with the seventh bore and receives one of the plurality of bolts so that the secondary flap overlaps and abuts the second side;
wherein the third bore is coaxial with the eighth bore and receives one of the plurality of bolts so that the third side overlaps and abuts the proximal side.

18. The energy absorber system of claim 16, further including a plurality of fasteners, wherein a respective one of the plurality of fasteners extends through each of the fourth bore and the fifth bore to thereby attach the inner wedge to the brace assembly.

19. An energy absorber for a vehicle, the energy absorber comprising:
an inner wedge attachable to the vehicle and defining a cavity therein, wherein the inner wedge has:
a primary side;
a secondary side spaced apart from the primary side;
a proximal side interconnecting the primary side and the secondary side; and
a distal side interconnecting the primary side and the secondary side and spaced apart from the proximal side; and
an outer wedge attachable to the inner wedge to thereby cover the cavity, wherein the outer wedge has:
a first side configured for contacting and covering the primary side;
a second side spaced apart from the first side and configured for contacting and covering the secondary side;
a third side interconnecting the first side and the second side and configured for contacting and covering the proximal side;
a fourth side extending from the third side at an angle of less than or equal to 90 degrees and having a deflection surface and an interior surface spaced opposite the deflection surface; and
a plurality of bulkheads projecting from the interior surface.

20. The energy absorber of claim 19, wherein the fourth side further includes a distal edge extending along the deflection surface and the interior surface, and further wherein the outer wedge has:
a first bulkhead extending along the interior surface from the third side to the distal edge;

a second bulkhead spaced apart from and substantially parallel to the first bulkhead, and extending along the interior surface from the third side to the distal edge;

a third bulkhead disposed between and substantially parallel to the first bulkhead and the second bulkhead, and extending along the interior surface from the third side to the distal edge; and a fourth bulkhead interconnecting and substantially perpendicular to the first bulkhead and the third bulkhead.

* * * * *